(12) United States Patent
Wang et al.

(10) Patent No.: US 6,459,094 B1
(45) Date of Patent: Oct. 1, 2002

(54) METHOD FOR STITCHING PARTIAL RADIATION IMAGES TO RECONSTRUCT A FULL IMAGE

(75) Inventors: Xiaohui Wang, Pittsford; David H. Foos; David J. Steklenski, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 10 days.

(21) Appl. No.: 09/782,724

(22) Filed: Feb. 13, 2001

Related U.S. Application Data

(63) Continuation of application No. 09/742,509, filed on Dec. 20, 2000.

(51) Int. Cl.$^7$ .......................... H05B 33/12; G03B 42/08
(52) U.S. Cl. .................... 250/584; 250/585; 250/491.1; 250/396 R; 382/284; 382/131
(58) Field of Search ................................ 250/585, 584, 250/491.1, 396 R; 382/284, 131

(56) References Cited

U.S. PATENT DOCUMENTS

| 5,912,467 | A | * | 6/1999 | Okino | 250/491.1 |
| 5,986,279 | A | | 11/1999 | Dewaele | |
| 6,180,947 | B1 | * | 1/2001 | Stickel et al. | 250/396 R |
| 6,269,177 | B1 | * | 7/2001 | Dewaele et al. | 382/131 |

FOREIGN PATENT DOCUMENTS

| BE | 0 919 856 A1 | 6/1999 |
| BE | 0 919 858 A1 | 6/1999 |
| JP | 0 866 634 A2 | 9/1998 |

\* cited by examiner

*Primary Examiner*—Constantine Hannaher
*Assistant Examiner*—Andrew Israel
(74) *Attorney, Agent, or Firm*—William F. Noval

(57) ABSTRACT

A method of forming a composite image from first and second digital images formed by recording first and second contiguous segments of a larger radiographic image in first and second overlapping storage phosphor members, exposed to a source of X-rays wherein the image content in the overlapped region is the same in both images and the end edge of the first member is present both on the first image and as a shadow edge in the second image, the method comprising: correcting for geometric distortion in the first and second digital images; determining any rotational displacement and any vertical displacement between the first and second images by matching the first member end edge in the first image to its shadow in the second image; correcting for image orientation based on any said rotational displacement; determining any horizontal displacement between the first and second images by correlating the image content in the overlapped region of the first and second images; and stitching said first and second images together along the first member end edge based on any said horizontal and vertical displacements.

8 Claims, 8 Drawing Sheets

METHOD FOR STITCHING PARTIAL RADIATION IMAGES TO RECONSTRUCT A FULL IMAGE

CROSS REFERENCE TO RELATED APPLICATIONS

This application is a continuations under 35 USC §120 of the earlier filing date of U.S. patent application Ser. No.: 09/742,509, filed Dec. 20, 2000, entitled Elongated Computed Radiography Cassette.

FIELD OF THE INVENTION

This invention relates in general to digital radiography, and in particular to the imaging of a long human body part, such as the spine or legs, using a storage phosphor-based computed radiography system.

BACKGROUND OF THE INVENTION

When a long segment of the human body is imaged using the conventional screen-film technique, special cassettes and films of extended length are used, such as 30×90 cm and 35×105 cm. As medical institutions are migrating from analog screen-film systems to digital modalities, such as computed radiography (CR), these types of exams impose a significant challenge. This is because the size of digital detector is limited. For example, the largest CR storage phosphor cassette from several major CR vendors is limited to 35×43 cm, which can only image a partial of the body part at a time. To address this problem, a method has been proposed that staggers several storage phosphor cassettes together in a specially made cassette holder (U.S. Pat. No. 5,986,279, European Patent App. EP0866342A1, EP0919856A1, and EP0919858A1). All the cassettes are exposed in a single x-ray exposure. Then image processing is applied to stitch all the partial images together. The advantage is that the method is compatible with the current CR readers. However, a pattern of reference markers needs to be imaged simultaneously with the patient in order to achieve precise geometric registration of the partial images. The shadow of the reference markers may obscure diagnostically important information in the stitched image. Also because of the overlapping of the cassettes, the metallic cassette frames introduce wide shadow artifacts in the resultant image that are sometimes objectionable. Moreover, the cassette holder is quite heavy and is typically mounted in a fixed position, which limits the users from moving it up and down for exact patient positioning. The cassette holder is bulky and does not conform to ISO/ANSI standards, which means that it can not be placed in the bucky grid holder that is designed for the current screen-film systems. U.S. patent application Ser. No.: 09/742,509 filed Dec. 20, 2000, discloses a method that is based on an extended length cassette with two 35×43 cm phosphor screens built inside. The two phosphor screens are slightly overlapped in the center of the cassette (FIGS. 1–3). The overall cassette size is about 35×85 cm, which nearly doubles the current largest cassette size and allows a fairly long segment of the human body to be imaged at a single exposure. The information recorded in either phosphor screen bears part of the desired final image.

During the readout process, one end of the cassette is placed in the CR reader and the first phosphor screen is scanned and stored, the cassette is then removed from the reader and inverted to allow the second phosphor screen to be read in the same manner as the first. The two images can then be processed into a composite full image if so desired. The length of the cassette can be designed to be shorter or longer in order to follow the ISO/ANSI standard, such as 36" and 51" inch long. The maximum cassette length is approximately twice the maximum allowable scan length of the CR reader.

Special digital image processing is required to construct a composite full image from the front and back images that are obtained from the two individual phosphor screens. The two phosphor screens are packed and partially overlapped inside the single cassette and are therefore not coplanar. This causes the image of the body part to be magnified differently for different locations in the cassette, and a demagnification operation is required as part of the process of registering the front and back images. In addition, the two phosphor screens will not be perfectly aligned inside the cassette, and there are translation and rotational displacements introduced by the CR reader during the image readout process. As a result, the placement of the pixels from the front and back images will not be perfectly aligned, and the images will require rotation and translation compensation. The aforementioned image registration processing can be accomplished by de-warping the front and back images to a set of reference markers (with known position) that are imaged in conjunction with the body part. However, it is desirable that the images be acquired without the use of any reference markers to preclude the possibility of obscuration of the important diagnostic regions of the image. It is therefore desirable to develop an image processing algorithm that can automatically (1) conduct image demagnification, (2) correct the translation and rotational displacements between the front and back images, and (3) make use of the information in the front and back images to form a composite full image that has high geometric fidelity without relying on any reference markers.

SUMMARY OF THE INVENTION

According to the present invention, there is provided a solution to the problems discussed above.

According to a feature of the present invention there is provided a method of forming a composite image from first and second digital images formed by recording first and second contiguous segments of a larger radiographic image in first and second overlapping storage phosphor members, exposed to a source of X-rays wherein the image content in the overlapped region is the same in both images and the end edge of said first member is present both on said first image and as a shadow edge in said second image, said method comprising: correcting for geometric distortion in said first and second digital images; determining any rotational displacement and any vertical displacement between said first and second images by matching said first member end edge in said first image to its shadow in said second image; correcting for image orientation based on any said rotational displacement; determining any horizontal displacement between said first and second images by correlating said image content in said overlapped region of said first and second images; and stitching said first and second images together along said first member end edge based on any said horizontal and vertical displacements.

ADVANTAGEOUS EFFECT OF THE INVENTION

The invention has the following advantages.

1. Enables the generation of a full composite image from two partial images that is free from artifacts by completely eliminating the use of references.

2. Preserves a high degree of geometric accuracy in the stitched image.

DETAILED DESCRIPTION OF THE INVENTION

In general, the present invention relates to the radiographic imaging of an elongate object such as the full spine (for diagnosing scoliosis, for example) or leg of a human subject.

Two contiguous CR plates contained in an elongated cassette are exposed to a radiographic image of an elongate object to produce a latent image stored in the CR plates. The CR plates are removably mounted in the cassette and are sequentially fed to a CR reader where the latent radiographic images are converted to two electronic images which are combined to form an elongated image. The elongate image can be displayed on an electronic display or printed out on hard copy media.

Figure 1A:
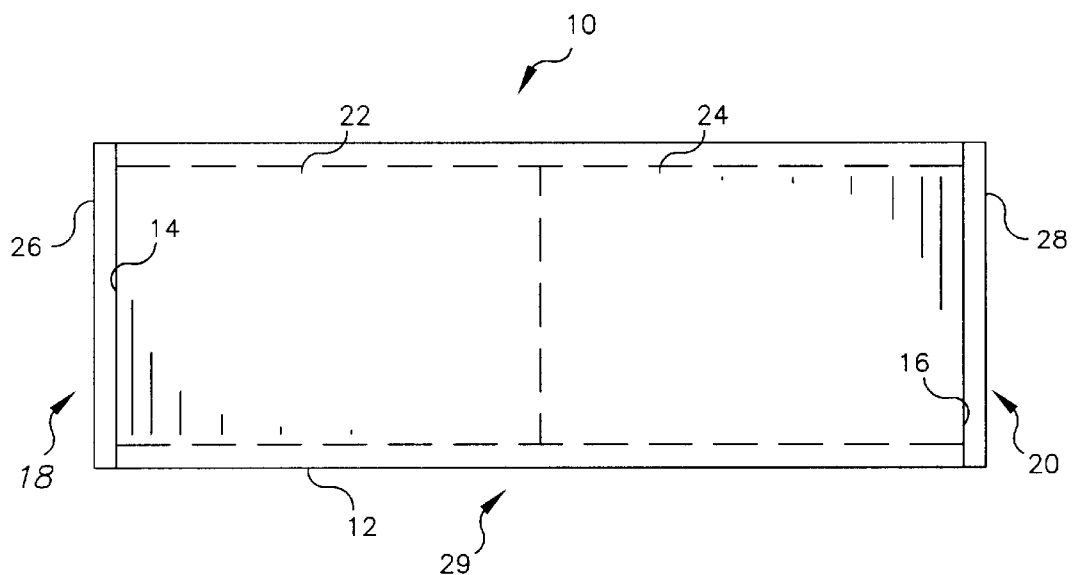
FIGS. 1A and 1B are diagrammatic views showing an extended length CR cassette with two storage phosphor screens built inside.
Figure 1B:
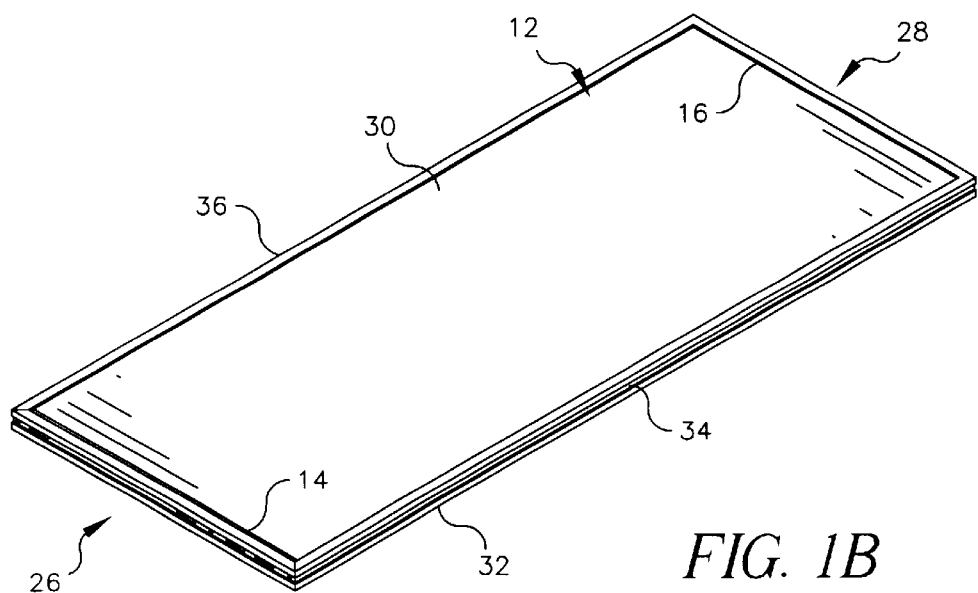

Referring now to FIGS. 1A and 1B, there is shown an embodiment of the present invention. As shown, storage phosphor cassette 10 includes an elongate rectangular shell 12 having first and second open ends 14 and 16. A first storage phosphor plate assembly 18 is detachably mounted in shell 12 from the first open end 14. A second storage phosphor plate assembly 20 is detachably mounted on shell 12 from the second open end 16. Each assembly 18, 20 includes a respective storage phosphor plate 22, 24 and a support and latching assembly 26, 28. Plates 22, 24 are butt joined or overlapped in the central region 29 of shell 12. Shell 12 includes upper and lower members 30, 32 and side extrusions 34, 36 which together form a rectangular shell.

Figure 2:
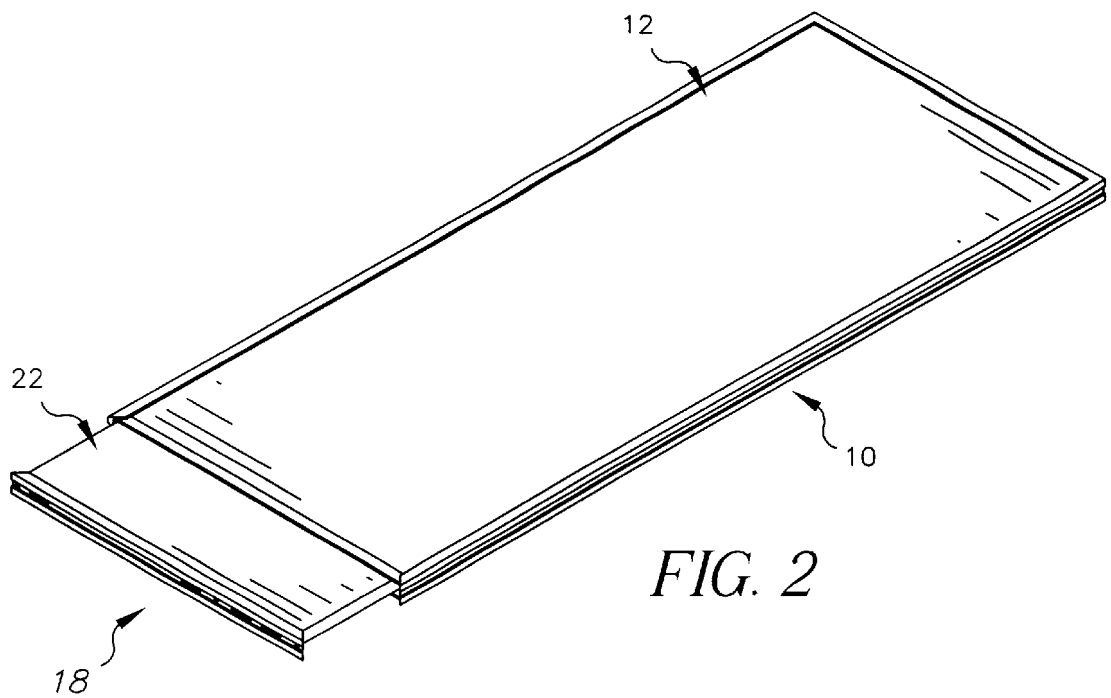
FIG. 2 is a perspective view showing one storage phosphor screen pulled from one end of the cassette as it would be during processing in CR reader. The other end of the cassette is capable of opening in a like manner.

FIG. 2 shows first storage phosphor assembly 18 partially detached from cassette 10 at a reading device (not shown).

Figure 3:
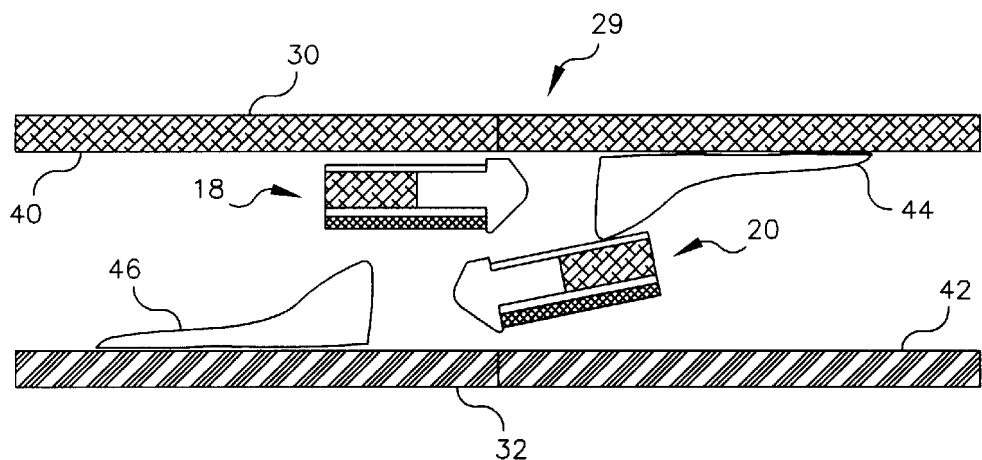
FIG. 3 is a diagrammatic view showing two phosphor screens which partially overlap in the center of the cassette. The deflectors guide the screens as they approach the center of the cassette to force the overlap.

FIG. 3 shows a cross-section of cassette 10 showing upper and lower members 30, 32 having respective opposed inner surfaces 40, 42 including deflectors 44, 46 extending therefrom for guiding the inner ends of assemblies 18, 20 to overlap. This results in an overlapping of storage phosphor plates 22 and 24 to form a composite storage phosphor plate for elongate radiographic images, such as the human spine and leg. A more detailed description of the latching and unlatching system and CR reader is given in U.S. patent application Ser. No.: 09/742,509 filed Dec. 20, 2000, the contents of which are incorporated herein by reference.

The first and second images read from first and second storage phosphor plates 22 and 24 are formed into a composite image according to the method of the present invention as follows.

An overview illustration of the steps involved in the present invention is shown in FIGS. 4–9. The generation of a full composite image from the front and back images is comprised of the following steps: (1) demagnification of each image pixel based on the distance between the x-ray source and the physical location of the pixel in the individual phosphor screen, (2) determination of the rotational displacement and the vertical displacement between the front and back images by matching the front screen ending edge in the front image to it's shadow in the back image, (3) image orientation correction based on the rotational displacement, (4) determination of the horizontal displacement between the front and back images by correlating the image information in the overlapping screen regions, and (5) stitching the front and the back images together along the front screen ending edge based on the horizontal and vertical displacements.

Figure 4A:
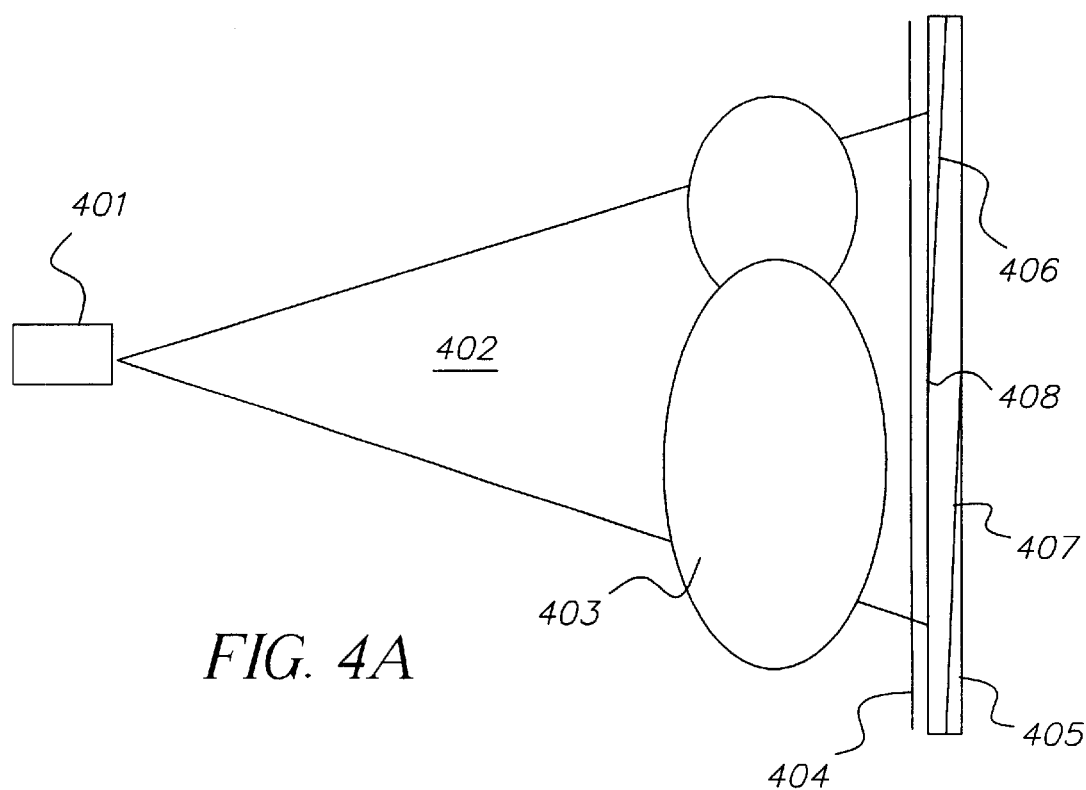
FIGS. 4A, 4B and 4C are diagrammatic views respectively showing how the extended length cassette is used to acquire images, how an object of rectangular shape placed in the patient location is deformed by magnification due to distance variation from the x-ray source to the storage phosphor screen, and how the acquired front and back image look. The CR reader over-scans both phosphor screens in the vertical direction of the cassette in order to make the screen ending edges fully visible in both images.
Figure 4B:
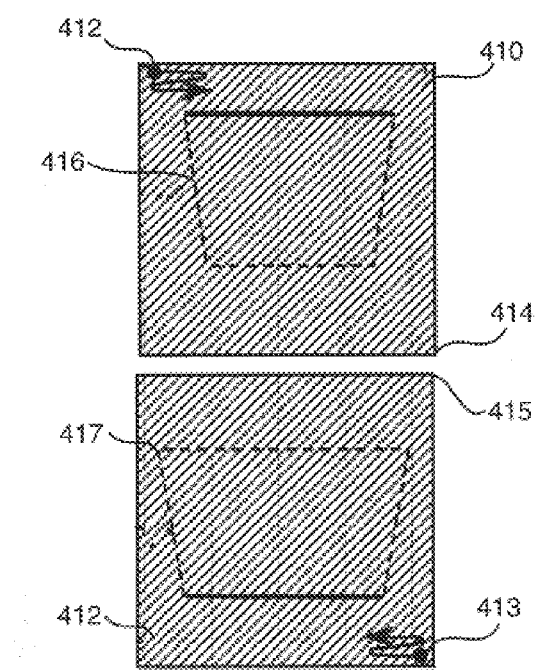
Figure 4C:
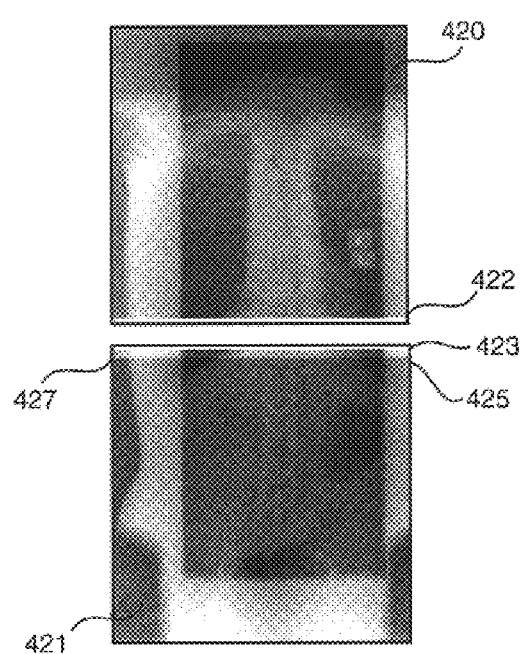

As shown in FIG. 4A, during an x-ray exam, the patient 403 is positioned in the path of the x-ray beam 402 from the x-ray tube 401. The extended length cassette 405 is placed behind the patient in order to record the image of the patient. The extended length cassette 405 can be used with an anti-scatter grid 404, which is positioned behind the patient 403 but directly in front of the cassette. The grid can be either a stationary type or moving bucky. After the x-ray generator is fired and the cassette is exposed, the image of the patient is recorded by the front screen 406 and the back screen 407 that are enclosed inside the cassette. Each screen captures only a portion of the image of the patient, as indicated by element 420 and 421 (FIG. 4C). Because the front screen 406 is not totally opaque to the incident x-rays, the back screen 407 can still record the image of the patient 403 in the screen overlap region 427. However, the signal-to-noise ratio of the image captured on the back screen in the overlap region 427 will be relatively low because of the x-ray attenuation caused by the front screen. The image content recorded by the two screens in the overlap region is the same. This redundant information is then used to register the front and back images to produce a full patient image. The front screen ending edge 408 can impose a distinctive edge shadow on the back screen. By comparing the location and orientation of the front screen ending edge with its shadow in the back image, the relative orientation and vertical displacement between the two images is determined. The exposure process described in this paragraph corresponds to element 500 in FIG. 5.

Figure 5:
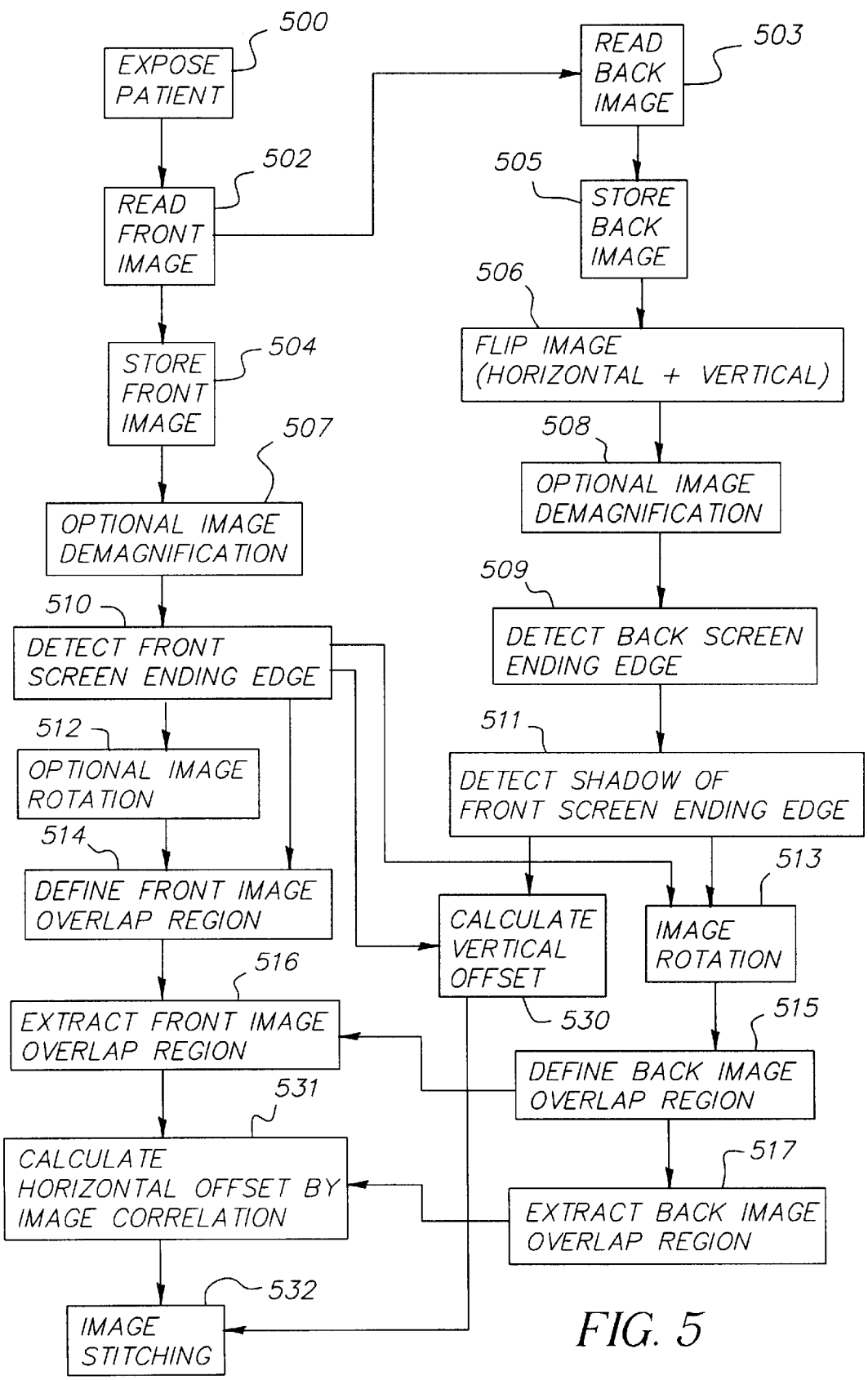
FIG. 5 is a flow diagram showing the image processing steps for automatic formation of a full composite image from first and second images.

After the x-ray exposure, the extended length CR cassette is sent to the CR reader for image readout. The front phosphor screen 410 is scanned using a laser beam in a line-by-line format as described by element 412. The depicted signal from the phosphor screen, which is linearly proportional to the magnitude of the recorded patient image signal, is extracted and converted into digital format. The CR reader may stop the reading process when the laser scan line nearly reaches the screen ending edge 414. This does not guarantee that the complete information of the ending edge will be recorded in the acquired image, which is required by this invention for image registration. To address this issue, the CR reader must over-scan the phosphor screen, i.e., scan slightly beyond the end of the screen. In FIG. 4C, element 420 represents the image acquired from the front screen, and shows that the screen ending edge, 422, is captured completely inside the image. The front image therefore is partitioned into two regions by the screen ending edge: the normal image area and the over-scanned image area. After the front screen is scanned and the image is stored in the CR memory, the cassette is removed from the reader and inverted to allow the back screen 407 (411) to be read in the same manner as the front screen. However, because of the inversion of the cassette, the laser beam conducts the scan in a format as indicated by element 413. Therefore, to restore the correct orientation of the back image, the acquired image must be flipped once horizontally and once vertically after being stored in the CR memory. Element 421 shows the acquired back image after the flip operations. Since both the back and front screens are of the same size, the back screen will also be over-scanned beyond its ending edge 415 (FIG. 4B). Consequently, the screen ending edge 423 will be captured completely inside the acquired back image 421. Due to screen overlap, the front screen ending edge 414 is also recorded by the back screen, which is indicated by element 425. The back image is therefore partitioned into three regions by the shadow of the front screen ending edge and further by the back screen ending edge. The end-to-end readout and storage process described in this paragraph corresponds to element 502, 504, 503, 505, and 506 as shown in FIG. 5.

Because the front and back storage phosphor screens are not exactly co-planar inside the extended cassette, there is a location dependent, although slight, geometric distortion (magnification) that is introduced, as indicated by elements 416 and 417. For a nominal SID (x-ray source distance) of 180 cm, the mismatch between the front and back images in the overlap region can be as large as 0.5 mm in the image horizontal axis. This can significantly impact the stitching precision and introduce discontinuity adjacent to the seam line in the stitched image. It is therefore necessary to perform distortion correction, especially as the distortion conspicuity increases as the SID decreases. The distortion correction process is accomplished using a mathematical model that is based on the geometric placement of the phosphor screens inside the cassette. The design of the extended length cassette forces the top of the front screen and the bottom of the back screen to be coplanar such that there is no geometric distortion near the two ends of the cassette. As the distance from either cassette end to the center decreases, the magnification increases. This phenomenon is more dominant in the horizontal axis than that in the vertical axis. To correct for this distortion, each pixel in the front image is dewarped using the following equations:

$$x'=x,$$
$$y'=(y-y_c) \times g_f \times x/x_{max}+y_c, \quad (1)$$

where x and y are image pixel coordinates in the vertical and horizontal axes, respectively, and x' and y' are the new image pixel coordinates, respectively, $g_f >=1$ is a constant specific to the front image and specific to the distance from the x-ray tube to the cassette, $x_{max}$ is the pixel coordinate maximum in the vertical axis, $y_c$ is the center coordinate in the horizontal axis of the image. The origin of the image pixel coordinate is defined at the image upper-left corner, with the downward-pointing vertical axis being the positive x-axis and the right-pointing horizontal axis being the y-axis. Eq. 1 essentially conducts variable correction for each image row but ignores the very small distortion in the vertical direction. The correction is conducted symmetric to the middle column of the image, which is valid because during the x-ray exposure the central x-ray beam is normally centered with the cassette. Similarly, the back image can be corrected using the formula given by:

$$x'=x,$$
$$y'=(y-y_c) \times g_b \times (x_{max}-x)/x_{max}+y_c, \quad (2)$$

where $g_b <=1$ is a constant specific to the back image and specific to the distance from the x-ray tube to the cassette. This image demagnification process is indicated by elements 507 and 508 in FIG. 5. This processing step can be ignored when the SID becomes large (>>180 cm), as the distortion introduced by the magnification factor is negligible.

In order to calculate the parameters that are used for stitching the front and back images, the screen ending edges in both the front and the back images must be located. This operation is shown by elements 509 and 510 in FIG. 5. The pixel values in the image region that is beyond the screen ending edge reflect the baseline noise level of the CR reader. This is because there is no signal contribution from the phosphor screen. Consequently, the pixel values in these regions are relatively low in comparison to those in the normally exposed image regions, therefore there is an abrupt pixel value decrement/discontinuity across the screen ending edge in the image. This pixel value discontinuity is used to detect the location and orientation of the screen ending edges, which can be accomplished in many ways. In the preferred embodiment of the present invention, the detection is carried out by (1) computing all the significant edge transition pixels in the proximity of the screen ending edge location, and (2) performing line delineation of the screen ending edge pixels.

Figure 6:
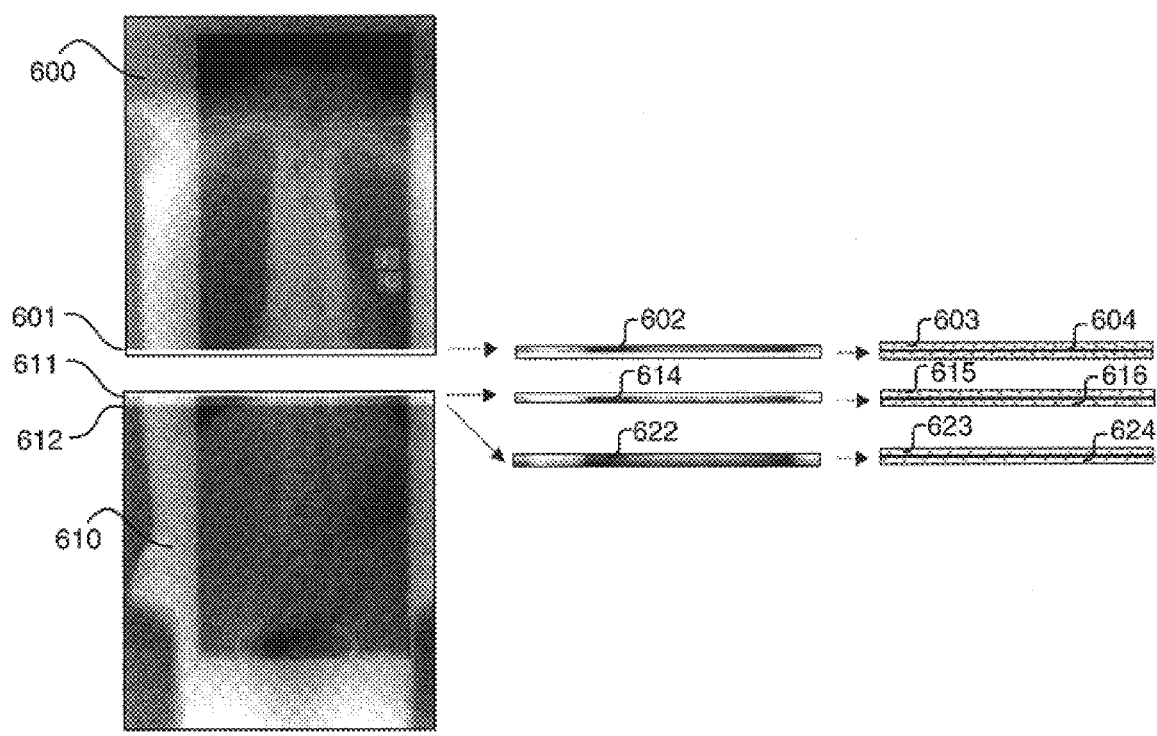
FIG. 6 shows the major image processing steps that are used to automatically find the locations and orientations of the screen ending edges in both the front and the back images, and for finding the location and orientation of the shadow of the front screen ending edge in the back image.

Using the front image as an example, FIG. 6 describes the preferred embodiment of the detection process. First, a narrow band 602 is extracted from the end of the front image 600. Depending on how the phosphor screen is being scanned in the CR reader, the orientation of the screen ending edge 601 can have a variation of several degrees in the acquired image from one scan to the next scan. Therefore, the size of the narrow band must be large enough such that the entire screen ending edge is reliably extracted. For an image that has a width of 2,048 pixels, the size of the narrow band should be approximately 200×2,048 pixels.

Second, the one-dimensional derivative of the image which is computed in the vertical direction using an operator [−1, 0, 1]. A one-dimensional derivative operator is preferred because the pixel value discontinuity only occurs across the edge direction, which is always nearly horizontal, and because of the computational efficiency advantages. A predefined threshold is used to select only those candidate edge transition pixels which are of greater magnitude and of falling slope. Element 603 shows the results from this step.

Third, a linear function is fitted to the candidate edge pixels and the best fitting parameters are obtained when the least square error is reached. Element 604 shows the fitted linear function overlaid on top of the edge transition pixels. The fitting parameters describe the ending edge location and orientation:

$$x = k_f \times y + a_f, \tag{3}$$

where $k_f$ and $a_f$ are the fitting parameters with $k_f$ the orientation and $a_f$ the offset of the front screen ending edge in the front image. Similarly, this process is conducted for the back image 610, except rising edge transition pixels are searched instead inside a narrow band 614 at the beginning of the processed back image. A new function is obtained by least-square-error fit:

$$x = k_b \times y + a_b, \tag{4}$$

where $k_b$ and $a_b$ are the fitting parameters with $k_b$ the orientation and $a_b$ the offset of the back screen ending edge in the back image.

Once the screen ending edge location is successfully found in the front image, it is compared with its shadow in the back image for image registration. To locate the shadow of the front screen ending edge in the back image (FIG. 5, element 511), a similar approach to element 509 is used. This is possible because the pixel values in the back image also undergo a strong signal intensity decrement in the screen overlap region 427 (FIG. 4C) due to the high attenuation of the incident x-rays by the front screen during the x-ray exposure. In order to locate the shadow of the front screen ending edge, the location of the narrow band needs to be defined in the back image. This can be calculated based on the size of the overlap regions (D in mm), which is determined by cassette design, the image pixel size (psize in mm), and the average location of the identified back screen ending. The distance from the center of the narrow band to the beginning of the back image is given by:

$$d = D/\text{psize} + (k_b \times y_c + a_b). \tag{5}$$

The function that is obtained using the least-square-error fit to describe the shadow of the front screen ending edge in the back image can be depicted as:

$$x = k \times y + a, \tag{6}$$

where k and a are the fitting parameters with k the orientation and a the offset.

Theoretically, parameters $k_f$ and k should be equal because they both represent the orientation of the front screen ending edge. However, they may differ by as much as several degrees in practice for several reasons such as misalignment between the two phosphor screens in the cassette or screen positioning variations in the CR reader during the readout process. The deviation between $k_f$ and k represents the orientation misalignment between the front and back images. To assure a seamless composite image after stitching, and to preserve high geometric fidelity, this misalignment must be corrected.

Misalignment correction is accomplished in one of three ways: (1) rotating the front image by $\theta = a\tan(k) - a\tan(k_f)$ while keeping the back image unchanged, (2) rotating the back image by $\theta = a\tan(k_f) - a\tan(k)$ while keeping the front image unchanged, or (3) rotating the front and back image by $-a\tan(k_f)$ and the back image by $-a\tan(k)$, respectively. The first and the second methods have the advantage of reduced computation because only one of the two images must be rotated. However, the orientation of the resultant front screen ending edge, which is also the orientation of the seam line in the composite stitched image, may still contain some residual mis-registration in the horizontal direction which can cause the seam line in the stitched image to appear jagged. The third method overcomes this disadvantage. FIG. 5, element 513 shows the effect of rotating the back image. Element 512, which shows the effect of rotating the front image, is optional depending on whether method 2 or method 3 was used Since the parameters that are used for aligning the front and back images, e.g., $k_a$, $k_b$, k, $a_a$, $a_b$, and a, are calculated before image rotation, the parameters must be transformed accordingly to reflect the new values in the rotated image(s). The parameters are modified by placing Eqs. 3, 4, and 6 into the transform given by:

$$x' = x\cos\theta + y\sin\theta,$$
$$y' = -x\sin\theta + y\cos\theta, \tag{7}$$

where (x', y') are the new coordinates in the rotated image, and θ is the rotation angle. For the simplicity of the description, the symbols $k_a$, $k_b$, k, $a_a$, $a_b$, and a will be used to represent the new transformed values.

The vertical displacement between the front and back image, x_offset, is defined as the vertical distance from each pixel in the back image to origin of the front image and is given by:

$$x\_\text{offset} = a_f - a_b. \tag{8}$$

Using the vertical displacement guarantees that the front and the back images are stitched along the ending edge of the front screen. This process is indicated by element 530 in FIG. 5.

Once the back screen ending edge, as described by $k_b$ and $a_b$, and the shadow of the front screen ending edge, as described by $k_a$ and $a_a$, are successfully identified, the location of the screen overlap region 427 (FIG. 4C) in the back image can be defined. The screen overlap region in the back image is located between the back screen ending edge and the shadow of the front screen ending edge. The size of the region is calculated based on the equation given by:

$$\text{overlap\_size} = (k \times y_c + a) - (k_b \times y_c + a_b), \tag{9}$$

and the vertical displacement from the back image origin is:

$$\text{overlap\_offset}_b = (k_b \times y_c + a_b). \tag{10}$$

Element 515 shows the aforementioned process. Using the computed value of overlap_size, the corresponding region in the front image is derived. This is the region of the same size but with a vertical displacement from the image origin defined by:

$$\text{overlap\_offset}_f = x_{max} - (k_a \times y_c + a_a) - \text{overlap\_size}. \tag{11}$$

This process is suggested by element 514. After the screen overlap regions are extracted from each image, as shown by elements 516 and 517, they are compared in the next step to find the horizontal displacement between the front and back images.

The image content recorded in the overlap regions are the same except for some horizontal displacement, y_offset, between the corresponding pixels. A one-dimensional correlation function is computed to find the displacement using the formula given by $$c(\Delta) = \Sigma_{ij} F(x_i, y_j) \times B(x_i, y_j + \Delta), \quad (12)$$

where $F(x_i, y_j)$ and $B(x_i, y_j)$ is the pixel value at $(x_i, y_j)$ in the extracted overlap region from the front and back images, respectively, and $\Delta$ is the horizontal displacement parameter for correlation. The $\Delta$ value at which $c(\Delta)$ reaches a maximum is the optimal value for y_offset.

Figure 8:
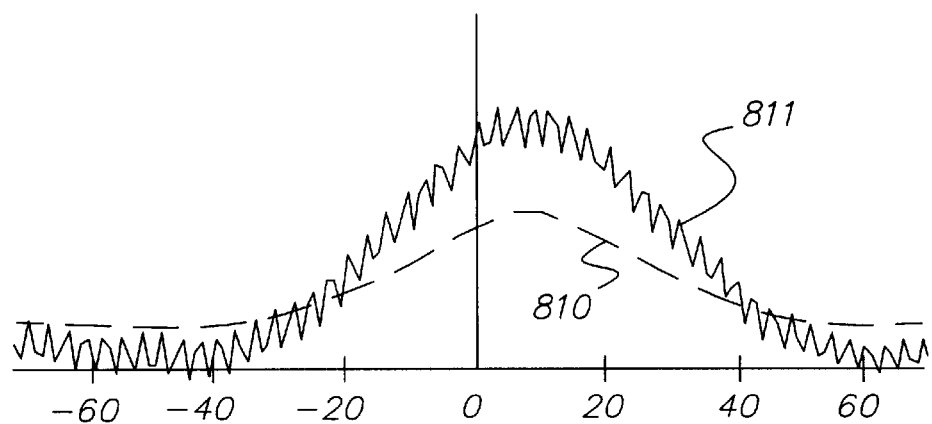
FIG. 8 is a graphical illustration of the correlation function.
Figure 7:
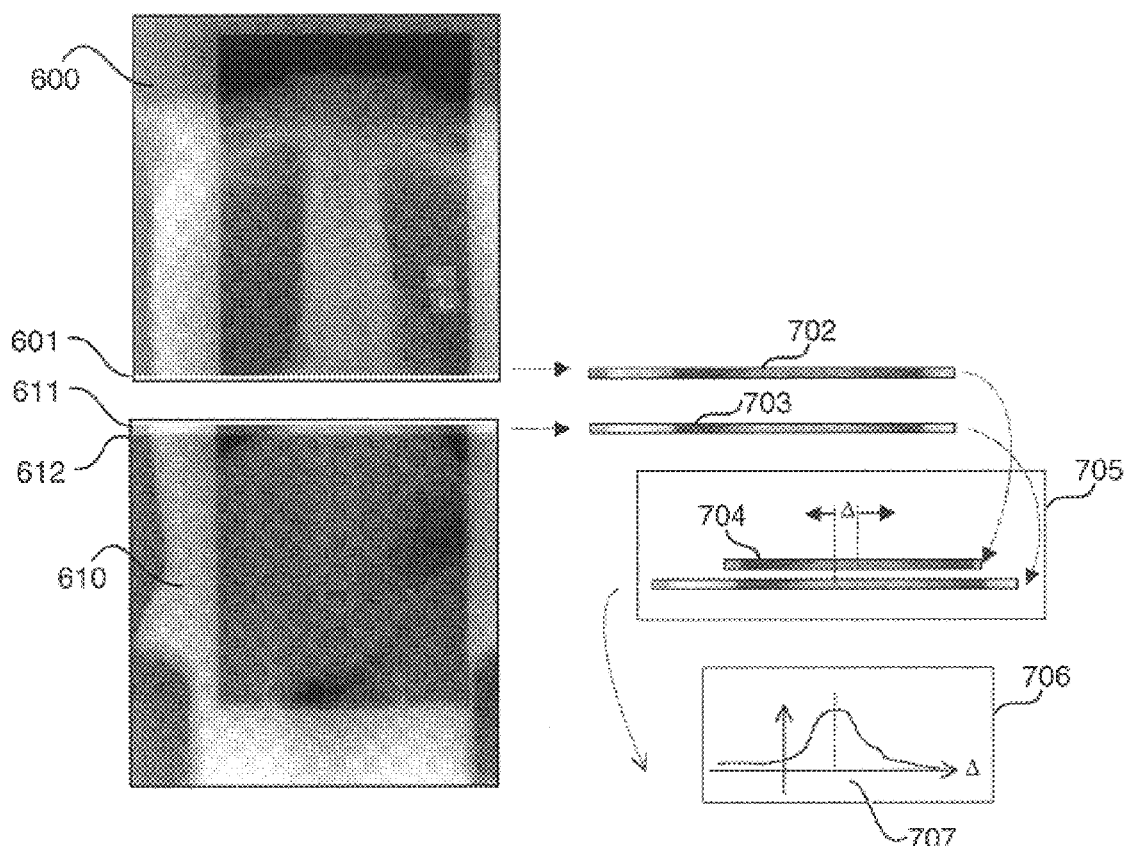
FIG. 7 shows the major image processing steps that are used for finding the horizontal displacement between the front and back images by image-correlation.

FIG. 7 describes the preferred implementation of this operation. First, the overlap region 702 and 703 are extracted from the front and back images respectively. Second, element 704 is obtained by extracting a portion of 702, then is correlated with 703 to create the correlation function $c(\Delta)$, 706. Similar results can be achieved by correlating a portion of 703 with 702. Third, the maximum of function $c(\Delta)$ is searched and the corresponding value of $\Delta$ is identified as y_offset, 707. Because the edge information in 702 and 703, including skin line, tissue boundaries, bone edges, collimation boundaries, and hardware labels etc, contribute the most useful information to the correlation, the low frequency content is removed from 702 and 703 in order to improve the correlation robustness. Normally the correlation function is smooth, as indicated by element 810 (FIG. 8). However, if stationary grid lines are present in the image, small periodic peaks can appear in the function, as indicated by element 811 (FIG. 8). The stationary grid imposes a periodic line pattern artifact in the acquired images, the artifact is particularly dominant when the grid is orientated in the vertical direction, and can correlate with itself, causing small spikes to be introduced on top of the back ground correlation function. This artifact will negatively impact the accuracy of the determination of the location of the true function maximum. To address this issue, low-pass filtering of the correlation function is used before searching for the maximum. The process described in this paragraph is represented by element 531 (FIG. 5).

Figure 9:
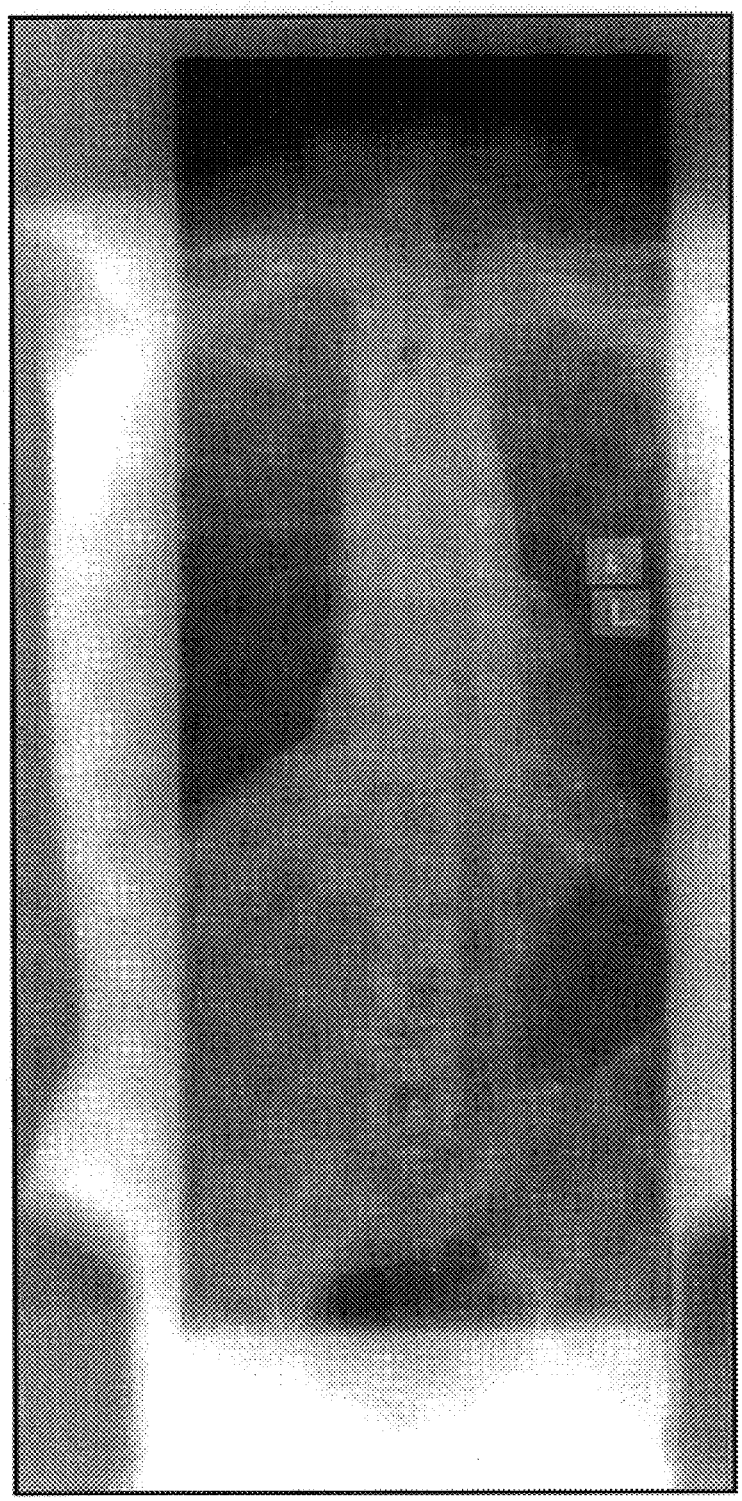
FIG. 9 shows the composite, stitched full image.

After both the front and the images have been demagnified, the relative orientation of the two images has been aligned, and x_offset and y_offset have been found, the back image is stitched to the front image. Each pixel of the front image is copied to the stitched image buffer except those pixels that are beyond the screen ending edge line. Each pixel in the back image is copied to the stitched image buffer with an displacement defined by x_offset and y_offset except those pixels before the shadow of the front screen ending edge. The resultant image is shown in FIG. 9. The process conducted in this paragraph is represented by element 532 (FIG. 5).

The invention has been described in detail with particular reference to certain preferred embodiments thereof, but it will be understood that variations and modifications can be effected within the spirit and scope of the invention.

PARTS LIST 10 storage phosphor cassette
12 elongated rectangular shell
14 first open end
16 second open end
18 first phosphor plate assembly
20 second phosphor plate assembly
22,24 storage phosphor plate
26,28 latching assembly
29 central region
30,32 upper and lower members
34,36 side extrusions
40,42 inner surfaces
44,46 deflectors
401 x-ray tube
402 x-ray beam
403 patient
404 x-ray anti-scatter grid
405 extended length cassette
406 front screen (lateral view)
407 back screen (lateral view)
408 ending edge of front screen (lateral view)
410 front screen (front view)
411 back screen (front view)
412 indication of laser scan direction for front screen
413 indication of laser scan direction for back screen
414 front screen ending edge (front view)
415 back screen ending edge (front view)
416 deformation of a rectangular object in patient position in front screen
417 deformation of a rectangular object in patient position in back screen
420 acquired image from front screen—front image
421 acquired image from back screen—back image
422 front screen ending edge
423 back screen ending edge
425 shadow of front screen ending edge in the back image
427 screen overlap region in the back image
500 exposure patient
502 read front image in the CR reader
503 read back image in the CR reader
504 store front image in the CR reader
505 store back image in the CR reader
506 flip back image once in horizontal direction and once in vertical direction
507 optional image demagnification of the front image
508 optional image demagnification of the back image
509 detect back screen ending edge in back image
510 detect front screen ending edge in front image
511 detect shadow of front screen ending edge in back image
512 optional rotation of front image
513 image rotation of back image
514 define screen overlap region in front image
515 define screen overlap region in back image
516 extract screen overlap region from front image
517 extract screen overlap region from back image
530 calculate vertical displacement—x_offset
531 calculate horizontal displacement—y_offset by image correlation
532 image stitching
600 acquired front image
601 front screen ending edge
602 extracted narrow band at the end of front image for identifying screen ending edge
603 candidate edge transition pixels (falling slope) in 602

604 fitted line overlaid on top of candidate edge transition pixels 610 acquired back image 611 back screen ending edge 612 shadow of front screen ending edge in the back image 614 extracted narrow band at the beginning of back image for identifying screen ending edge 615 candidate edge transition pixels (rising slope) in 614

616 fitted line overlaid on top of candidate edge transition pixels 622 extracted narrow band for searching of shadow of front screen ending edge 623 candidate edge transition pixels (rising edge) in 622

624 fitted line overlaid on top of candidate edge transition pixels 702 extract screen overlap region from front image 703 extracted screen overlap region from back image 704 portion of 702

705 process for conducting image correlation 706 correlation function 707 location of maximum in the correlation function 810 low-pass filtered 811

811 spikes in the correlation function due to the use of grid.

What is claimed is:

1. A method of forming a composite image from first and second digital images formed by recording first and second contiguous segments of a larger radiographic image in first and second overlapping storage phosphor members, exposed to a source of X-rays wherein the image content in the overlapped region is the same in both images and the end edge of said first member is present both on said first image and as a shadow edge in said second image, said method comprising:

correcting for geometric distortion in said first and second digital images;

determining any rotational displacement and any vertical displacement between said first and second images by matching said first member end edge in said first image to its shadow in said second image;

correcting for image orientation based on any said rotational displacement;

determining any horizontal displacement between said first and second images by correlating said image content in said overlapped region of said first and second images; and stitching said first and second images together along said first member end edge based on any said horizontal and vertical displacements.

2. The method of claim 1 herein said first and second digital images include a matrix of pixels and wherein said geometric distortion correction of said images varies over the length of said images.

3. The method of claim 2 wherein said geometric distortion correction increases in said overlapped region of said image.

4. The method of claim 2 wherein said geometric distortion correction is a function of the distance between said first and second overlapping storage phosphor plates and said source of X-rays.

5. The method of claim 1 wherein said first member end edge is located within said first and second images by detecting pixel value discontinuity in said overlap region of said images.

6. The method of claim 5 wherein said pixel value discontinuity detection is carried out by (1) computing all the significant edge transition pixels in the proximity of the first member end edge location, and (2) performing line delineation of the end edge pixels.

7. The method of claim 1 wherein said correcting for image orientation is carried out by one of, (1) rotating said first digital image while keeping said second digital image unchanged, (2) rotating said second digital image while keeping said first digital image unchanged, or (3) rotating both said first and second digital images relative to one another.

8. The method of claim 1 wherein said determining any horizontal displacement is carried out (1) by defining and extracting the first image overlap region, (2) by defining and extracting the second image overlap region, and (3) calculating any horizontal displacement by image correlation.

* * * * *